United States Patent [19]
Baiyor et al.

[11] Patent Number: 6,115,461
[45] Date of Patent: *Sep. 5, 2000

[54] APPARATUS, METHOD AND SYSTEM FOR PROVIDING INFORMATION TO A CALLED PARTY IN MULTIPLE LEG TELECOMMUNICATION SESSIONS

[75] Inventors: Robert J. Baiyor; Deborah Thomas Earl, both of Naperville; Harold Robert Smith, Jr., Oakbrook Terrace; Thomas Dale Strom, Naperville, all of Ill.

[73] Assignee: Lucent Technologies Inc., Murray Hill, N.J.

[*] Notice: This patent is subject to a terminal disclaimer.

[21] Appl. No.: 09/097,527

[22] Filed: Jun. 15, 1998

[51] Int. Cl.$^7$ ...................................................... H04M 3/42
[52] U.S. Cl. .......................... 379/211; 379/201; 379/202; 379/211; 379/204; 379/352
[58] Field of Search ..................................... 379/142, 202, 379/211, 215, 428, 352, 144, 233, 201, 204; 370/260

[56] References Cited

U.S. PATENT DOCUMENTS

| | | | |
|---|---|---|---|
| 5,206,901 | 4/1993 | Harlow et al. | 379/211 |
| 5,287,401 | 2/1994 | Lin | 379/215 |
| 5,636,269 | 6/1997 | Eisdorfer et al. | 379/215 |
| 5,715,311 | 2/1998 | Sudo et al. | 379/428 |
| 5,802,160 | 9/1998 | Kugell et al. | 379/211 |

Primary Examiner—Krista Zele
Assistant Examiner—Bing Bui
Attorney, Agent, or Firm—Nancy R. Gamburd

[57] ABSTRACT

A system, apparatus and method are provided for providing information to a called party of multiple leg telecommunication sessions, such as in a flexible alerting service. The preferred system includes a home location register coupled to a mobile switching center. The home location register has, stored in a memory, a plurality of secondary directory numbers associated with a primary directory number, such as an ANSI compatible pilot directory number. The mobile switching center has an interface for receiving an incoming call leg designating the primary directory number and for differentially processing and routing each outgoing call leg associated with each secondary directory number, of the plurality of secondary directory numbers, the mobile switching center further providing in each outgoing call leg, of a plurality of outgoing call legs, first called party information distinguishing each outgoing call leg as a multiple leg telecommunication session. In the preferred embodiment, a waiting signal is provided to called parties, such as a steady, audible tone.

38 Claims, 5 Drawing Sheets

APPARATUS, METHOD AND SYSTEM FOR PROVIDING INFORMATION TO A CALLED PARTY IN MULTIPLE LEG TELECOMMUNICATION SESSIONS

CROSS-REFERENCE TO RELATED APPLICATIONS

This application is related to Baiyor et al., U.S. patent application Ser. No. 09/094,837, entitled "Apparatus, Method And System For Controlling The Start Of Alerting Of Multiple Leg Telecommunication Sessions", filed concurrently herewith and commonly assigned to Lucent Technologies, Inc., and incorporated by reference herein, with priority claimed for all commonly disclosed subject matter (the "first related application").

This application is related to Baiyor et al., U.S. patent application Ser. No. 09/097,334, entitled "Apparatus, Method And System For Controlling Secondary Treatment By a Distant Switch Of Multiple Leg Telecommunication Sessions", filed concurrently herewith and commonly assigned to Lucent Technologies, Inc., and incorporated by reference herein, with priority claimed for all commonly disclosed subject matter (the "second related application").

FIELD OF THE INVENTION

The present invention relates in general to telecommunication systems, and more particularly, to an apparatus, method and system for providing information to a called party in multiple leg telecommunication sessions.

BACKGROUND OF THE INVENTION

With the advent of increasingly sophisticated telecommunication services, various proposals have been made to allow a single call, incoming to a telecommunication switch, to branch into multiple, independent outgoing calls (or legs) to different called parties, during the same period of time. These incoming and multiple outgoing calls may be wireline, such as PSTN (public switched telephone network), ISDN (integrated services digital network), or T1/E1 wireline calls, or may be wireless, such as cellular calls or other mobile service communications.

Once such proposal is included in the ANSI-41 specification promulgated by the American National Standards Institute for wireless telecommunication, such as cellular communication, and is referred to as "flexible alerting". The ANSI-41 flexible alerting specification, however, does not include any specific directions or guidelines for implementation and control of such independent, concurrent outgoing multiple leg calls.

Other prior art systems also do not provide for multiple outgoing calls, to different parties, during the same time period. Rather, such known systems provide for individual, sequential calls rather than multiple, concurrent outgoing calls. For example, the incoming call may first alert a home telephone having a first directory number; if the first call is unanswered, that call leg is dropped and a second telephone having a different, second directory number is alerted, such as a cellular phone. If the second call is unanswered, that second call leg is dropped, and a third line having a third directory number is alerted, such as a pager.

In such flexible alerting or other systems having multiple, independent outgoing call legs from a single incoming call leg, whichever outgoing call leg is first to answer will receive the call and be connected to the calling party, with the other call legs being released (i.e., dropped or torn down, with their corresponding alerting ceased). A particular difficulty with such multiple outgoing call legs arises because of the processing time required to connect the answering outgoing call leg to the incoming call leg of the calling party. This processing or connecting time may result in a time gap between when the called party answers the outgoing call leg and when the called party is actually connected to the calling party and actual communication may occur.

If such a processing or connection time period is unknown to the called party, the called party may begin communication prior to completion of the actual connection with the calling party. During such premature communication, i.e., intended communication occurring prior to completion of the actual communication connection, significant information may be lost or clipped, resulting in customer irritation, frustration, and customer complaints to the service provider. For example, greetings such as "hello", while verbalized by the called party, may not actually be communicated and received by the calling party, resulting in subscriber dissatisfaction.

As a consequence, a need remains for an apparatus, method and system to implement and control multiple, independent outgoing communication sessions (or call legs or links) originating from a single incoming call leg. Such an apparatus, method and system should also provide information, to the called party of the answering outgoing call leg, indicative of a such a processing or connecting time period. The information provided to the called party should distinguish a flexible alerting call leg or other multiple outgoing call leg from other types of communication sessions, thereby indicating to the called party that the answered call has a processing or connection time period and that actual communication is not yet available. Such an apparatus, method and system should also be user friendly and user transparent.

SUMMARY OF THE INVENTION

A system, apparatus and method are provided for providing information to a called party in multiple leg telecommunication sessions, such as for providing a waiting signal on outgoing call legs for a flexible alerting service. The preferred system embodiment includes a home location register coupled to a mobile switching center. In the preferred system embodiment, a mobile switching center receives an incoming call leg designating a primary directory number ("DN"). A subscriber or other user of flexible alerting or other multi-leg communications, typically predefines a group of other directory numbers, referred to herein as secondary DNs, which are to be associated with the primary DN, such that when a call is placed to the primary DN, all of the secondary DNs are alerted. Such a list or grouping may be referred to as a flexible alerting group, or more broadly as an alerting group. The incoming call to the primary DN is then to be processed by a mobile switching center, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

To provide information to a called party in outgoing call legs of a flexible alerting service, in accordance with the present invention, the home location register has stored in a memory a plurality of secondary directory numbers associated with a pilot directory number. The mobile switching center has an interface for receiving an incoming call leg designating the pilot directory number and for differentially processing and routing each outgoing call leg associated with each secondary directory number, and further providing in each outgoing call leg, of a plurality of outgoing call legs, first called party information distinguishing each outgoing call leg as a multiple leg telecommunication session. In the various embodiments, the first called party information may be a waiting signal, such as a distinctive, steady, audible tone. Other types of first called party information include a primary directory number, a calling party identification having a distinctive identifier, a language request, or an indicator of an amount of outgoing call legs in the plurality of outgoing calls.

In additional embodiments, the switching center, subsequent to an answering of an outgoing call leg, further provides a second called party information to all non-answering outgoing call legs of the plurality of outgoing call legs. Such second called party information, in the preferred embodiment, is an indication to the non-answering outgoing legs of the answering of the incoming call by another outgoing call leg.

Numerous other advantages and features of the present invention will become readily apparent from the following detailed description of the invention and the embodiments thereof, from the claims and from the accompanying drawings.

DETAILED DESCRIPTION OF THE INVENTION

As mentioned above, a need remains for an apparatus, method and system to implement and control multiple, independent outgoing communication sessions (or call legs or links) originating from a single incoming call leg. In accordance with the present invention, an apparatus, method and system provide information, to the called party of the answering outgoing call leg, indicative of a processing or connecting time period. The information provided to the called party distinguishes a flexible alerting call leg or other multiple outgoing call leg from other types of communication sessions, thereby indicating to the called party that the answered call has a processing or connection time period and that actual communication is not yet available. The apparatus, method and system of the present invention are also user friendly and user transparent.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary DNs are alerted. Such a list or grouping may be referred to as a flexible alerting group, or more broadly as an alerting group or a secondary DN group. The incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. Such flexible alerting may also be useful for other business and personal uses, such as multiple calls to a home, office, and cellular telephone. For example, a child may call a single DN, namely, a parent's pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

As a consequence, for the purposes of the present invention, a person referred to as a called party may receive telecommunication calls in at least two different ways. First, the called party may receive calls directly via incoming calls placed to their directory number. Second, if their directory number is defined as a secondary DN in an alerting group, they may receive calls indirectly via incoming calls placed to the pilot DN (or primary DN) of the alerting group. The present invention is directed to providing information to a called party to enable the called party to distinguish between these two types of calls, direct calls and flexible alerting calls, particularly in light of the connection time lag discussed above for flexible alerting calls.

Figure 1A:
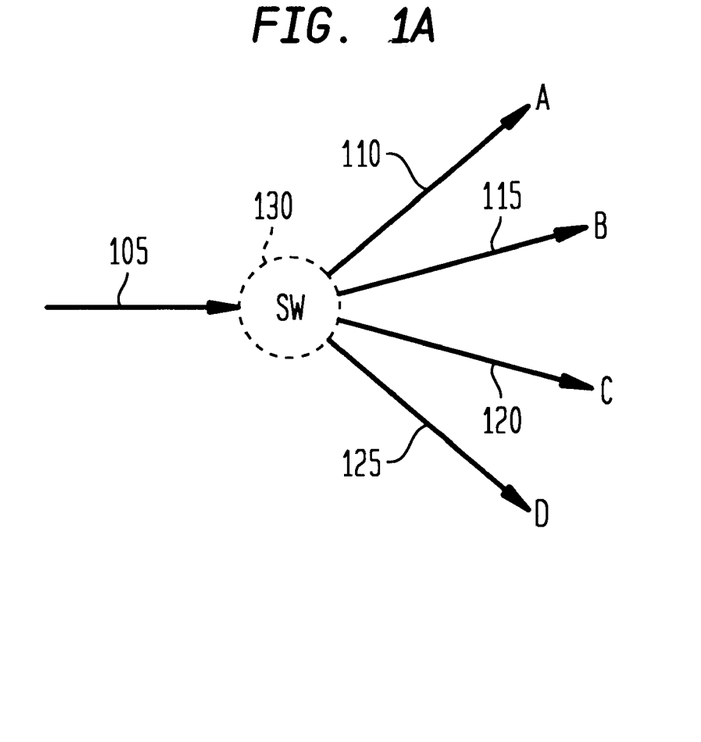
FIG. 1A is a diagram illustrating alerting of multiple outgoing communication sessions, commencing upon processing of an incoming call to a network switch, prior to answering of an outgoing communication session, with provision of information to all called parties in accordance with the present invention.

The ANSI-41 specification, however, does not address the timing or control of these multiple outgoing calls, and does not address any issue concerning providing information to a called party. Rather, the ANSI-41 specification merely addresses and requires that an incoming call to a pilot DN be routed to the associated, secondary DNs of the flexible alerting group, with the calling party ultimately connected to the answering party. FIG. 1A is a diagram illustrating alerting of multiple outgoing communication sessions, commencing upon processing of an incoming call to a network switch 130, prior to answering of an outgoing communication session, with provision of information to all called parties in accordance with the present invention.

As illustrated in FIG. 1A, an incoming call 105 is received and processed by a network switch 130. Following processing of the incoming call leg, call placement and other processing commences for four independent outgoing communication sessions A, B, C and D, namely, outgoing call legs 110, 115, 120 and 125 respectively. These various outgoing call legs may be routed to any type of secondary DN, such as wireline or wireless, and also may be routed through one or more nodes, which may be any combination of PSTN, satellite, or wireless nodes, or may require an additional mobile paging message to locate a mobile telephone. As these calls are processed, the switch 130 presumably and with reasonable certainty has no a priori knowledge concerning which, if any, of the outgoing call legs 110, 115, 120 and 125 will be answered. As a consequence, in accordance with the invention of another related patent application of Lucent Technologies, Inc., an open connection is maintained between the incoming call leg 105 and all of the outgoing call legs 110, 115, 120 and 125, unless and until one of the outgoing call legs is, in fact, answered by a called party. Once one of the outgoing call legs 110, 115, 120 and 125 is answered, then a voice path, connection or link will be established between the incoming call leg 105 and the answering outgoing call leg.

Figure 1B:
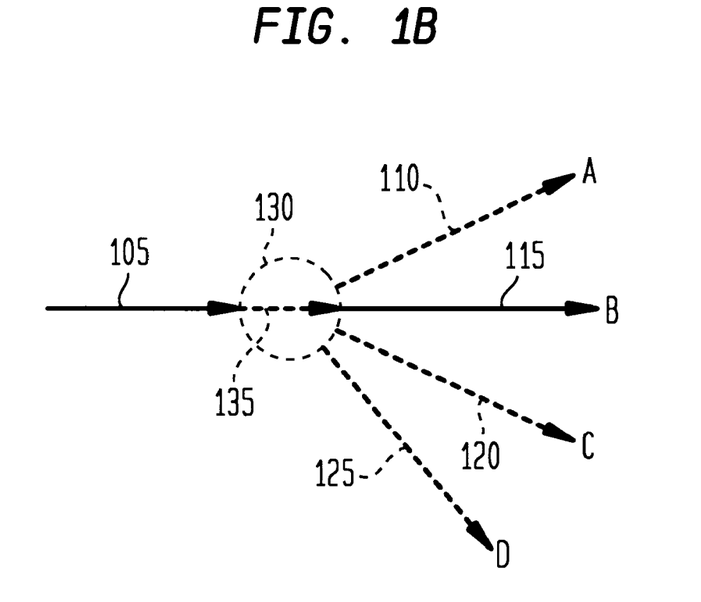
FIG. 1B is a diagram illustrating connection of an answering outgoing communication session (call leg) with an incoming call, with provision of information to the answering called party, in accordance with the present invention.

FIG. 1B is a diagram illustrating such connection of an answering outgoing communication session with an incoming call leg 105, with provision of information to the answering called party, in accordance with the present invention. As illustrated in FIG. 1B, outgoing call leg 115 to called party B has been answered. As a consequence, outgoing call legs 110, 120 and 125 are being released or dropped, and a connection 135 is being established between incoming call leg 105 and outgoing call leg 115. No such connection 135 is illustrated in FIG. 1A because, as mentioned above, an open connection is maintained (i.e., no connection is established).

As mentioned above, this call processing of establishing a connection 135 between the incoming call leg 105 and the answering outgoing call leg 115 may take a certain amount of time, which may be referred to as a connection time lag. If communication is attempted prior to completion of the connection 135, information may be lost or clipped. For example, all or part of an initial greeting may be clipped, such as a spoken "hello" being received as "lo". In addition, if the called party (in this case, called party B) does not hear an immediate response, the called party may believe erroneously that his or her telephone was alerted in error as well, i.e., the telephone rang without an actual call being present. If such processing or connecting times are unknown to the consumer or subscriber, even short delays of less than a second (preferable, one-half second or less) may create dissatisfaction. Accordingly, it is highly desirable to notify or otherwise inform the called party that the call they have just answered is a flexible alerting call (or other multi-leg communication session), thereby distinguishing such a call from a call which may have been placed directly to their directory number, in accordance with the present invention.

As a consequence, in accordance with the present invention, information is provided by the switch 130 on all outgoing call legs of a flexible alerting or other multi-leg communication session, in this case, outgoing call legs 110, 115, 120 and 125 as illustrated in FIG. 1A. Such information to a called party is not provided for direct calls to that directory number. Accordingly, any answering party will be provided with information that the call is a flexible alerting call when he or she answers the outgoing call leg, in this case, outgoing call leg 115 answered by called party B. In accordance with the present invention, when called party B answers the outgoing call leg 115, they are thereby provided with information which distinguishes the outgoing call leg 115 as a flexible alerting call (or other multi-leg communication session) from other call types that may be received, such as direct calls to the directory number. When called party B hears or otherwise receives this information from the switch 130, called party B is then made aware that a connection lag time period is occurring, and that B should wait a short time before communicating, until the notification or other information ceases or is turned off (typically less than 1 second and preferably less than one-half second). In the preferred embodiment, the information provided to the called party is referred to as a "waiting tone" or "waiting signal", distinguishing this new signal from other information given to a calling party such as dial tones, ringing tones or busy signals. When the waiting tone ceases, the connection is complete and actual communication may begin.

Such a waiting tone, waiting signal, or other information provided to a called party, is not referred to in and is wholly independent of the ANSI-41 specification or any other telecommunications standard or specification. The new waiting tone, waiting signal, or other information provided to a called party is also independent of any particular network embodiment, and may be utilized to provide information to a called party in any kind of telecommunication system, including wireline or wireless.

In the preferred embodiment, the information provided to a called party consists of an audible waiting tone or signal, that is or may be aurally perceived by a listener as a continuous or steady tone, without perceptible interruption. Such a waiting signal may be, for example, a steady audible ringback. A continuous tone is utilized, rather than a periodic signal, to avoid a potential situation of a called party answering an outgoing call leg during an off or quiet cycle of a periodic signal, when such a signal may be inaudible and thereby not providing distinguishing information to the called party.

In addition, the waiting tone is provided concurrently on all outgoing call legs, prior to any potential answering by any of the called parties. In this way, the waiting tone is immediately available to whichever called party answers first, with no intervening time lag between answering and provision of the tone.

In addition to a waiting tone, there are other means to distinguish flexible alerting calls (or other multi-leg communication sessions) from direct calls. First, for alerting group members having equipment providing a calling party number display, another sign such as a "*" (star), a "#" (pound), a special digit sequence (such as "99"), or any other distinctive identifier or other mark, may be added as a prefix or suffix to the displayed calling number in order to designate a flexible alerting call. In addition, the called directory number could also be displayed, indicating to the called party whether the outgoing call leg was a flexible alerting call (displaying the pilot or primary DN), or whether the call was a direct call (displaying the directory number or secondary DN).

Other types of information may also be provided to called parties of these multiple leg calls. In addition to information provided at the time of answering, information may be provided after a call has been answered. For example, when one called party answers an outgoing call leg, information may be provided to the other called parties to inform them that the call has been answered by another member of the alerting group. Those other members are then made aware that they may no longer need to answer their outgoing call leg. For example, a special ring pattern may be used to inform the other called parties that the call has already been answered or has been dropped. Similarly, for a brief period after one call leg has been answered, another distinctive tone (other than the selected waiting tone) may also be utilized to inform the other called parties, if they have also answered prior to that call leg being released, that the call has been answered by another group member. In this regard, a message such as "this was a flexible alerting call which has been answered by someone else" may also be utilized.

Another type of information may also be useful for the called parties, namely, information prior to answering, which may aid in the called party's decision to answer or not answer the particular call, or may aid in the most appropriate called party responding to the call. For example, the total number of other called parties (outgoing call legs) may also be displayed to each of the other called parties. If many other flexible alerting group members are being alerted, this may enable a busy member to disregard the incoming call leg, compared to very few members being alerted.

Other information which may be useful for a called party may also be transmitted. Such information may include a notification of the language of the calling party, such as 1 for English and 2 for Spanish, to enable the most appropriate member of the flexible alerting group to respond to the call. Other types of calling party information, which may be designated by the flexible alerting subscribers, also may be provided which is appropriate or useful to direct the incoming call leg to the most suitable called party.

Figure 2:
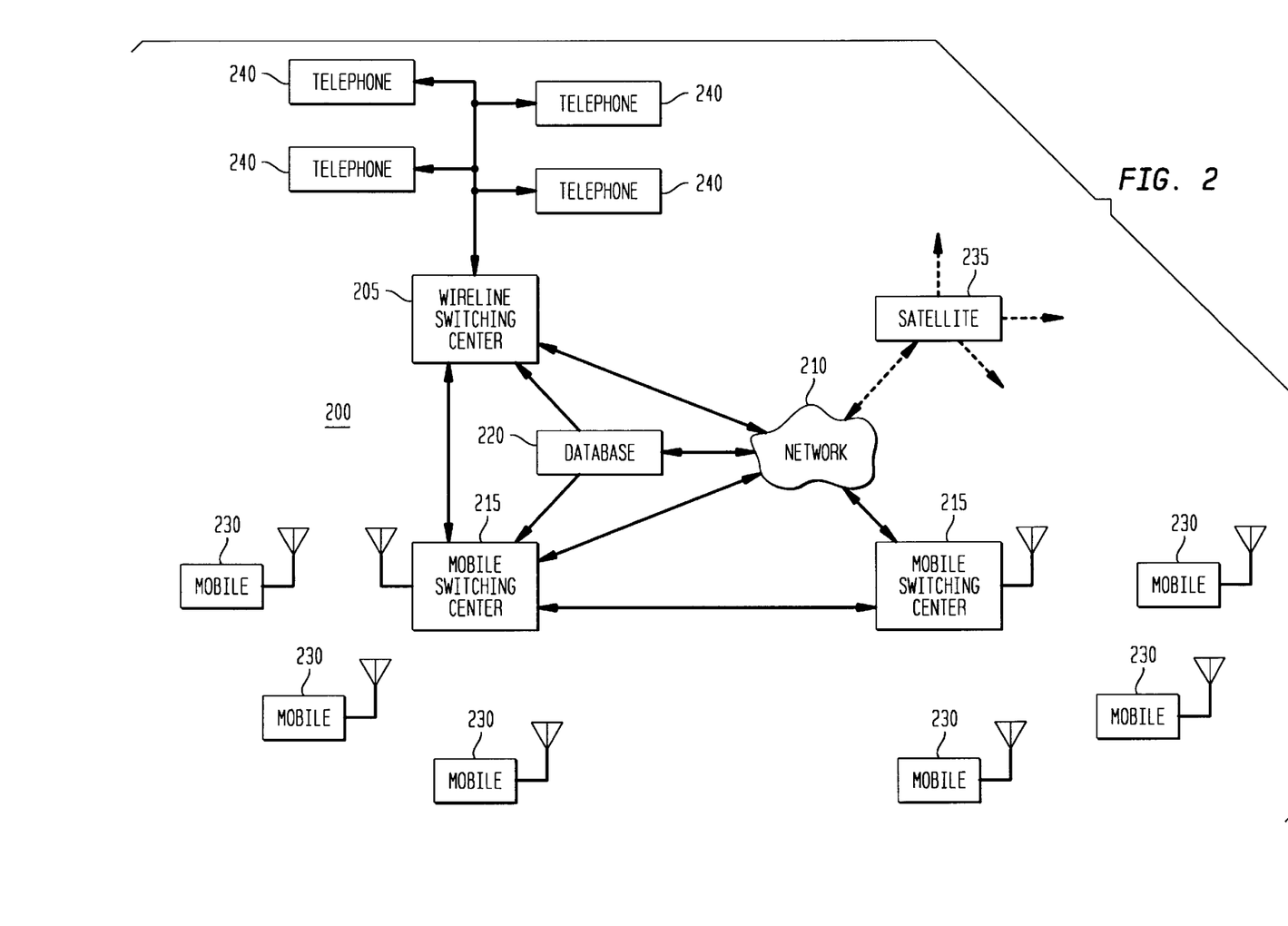
FIG. 2 is a block diagram illustrating a first system embodiment in accordance with the present invention.

FIG. 2 is a block diagram illustrating a first system embodiment 200 in accordance with the present invention. The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected to or coupled to a wireline switching center 205 and to a MSC 215. A database 220 may also be directly included or integrated within the various switching centers 205 and 215. The wireline switching center 205 is also generally connected to a plurality of telephones 240 or other customer premise equipment, while the MSCs 215 typically have a wireless link to the various mobile units 230, such as cellular telephones within a particular geographic region. In addition, while the wireline and mobile switching centers 205 and 215 are usually physically separated due to regulatory and other historical reasons, these switching centers may also be combined into one or more switching centers having both wireline and wireless functionalities.

Continuing to refer to FIG. 2, an incoming call directed to a primary DN may be received by either the wireline switching center 205 or one of the mobile switching centers 215. The switching center 205 or 215 then transmits a request to database 220 for an alerting list containing the secondary directory numbers associated with the primary or pilot DN (such as a termination list). The database 220 transmits a response to the corresponding switching center 205 or 215, containing or listing both the associated DNs and, as disclosed in the first related application, their corresponding timing delay parameters (one for each associated DN). Utilizing these secondary DNs and corresponding timing delay parameters, the switching center 205 or 215 begins the processing and routing of the associated outgoing call legs, with such processing and routing of each outgoing call leg delayed according to its corresponding timing delay parameter. As the outgoing calls are routed to their respective secondary DNs, a waiting signal or other distinguishing type of information is provided to each outgoing call leg by the switching center 205 or 215. Additional details of operation of the system 200 are discussed in greater detail below.

Figure 3:
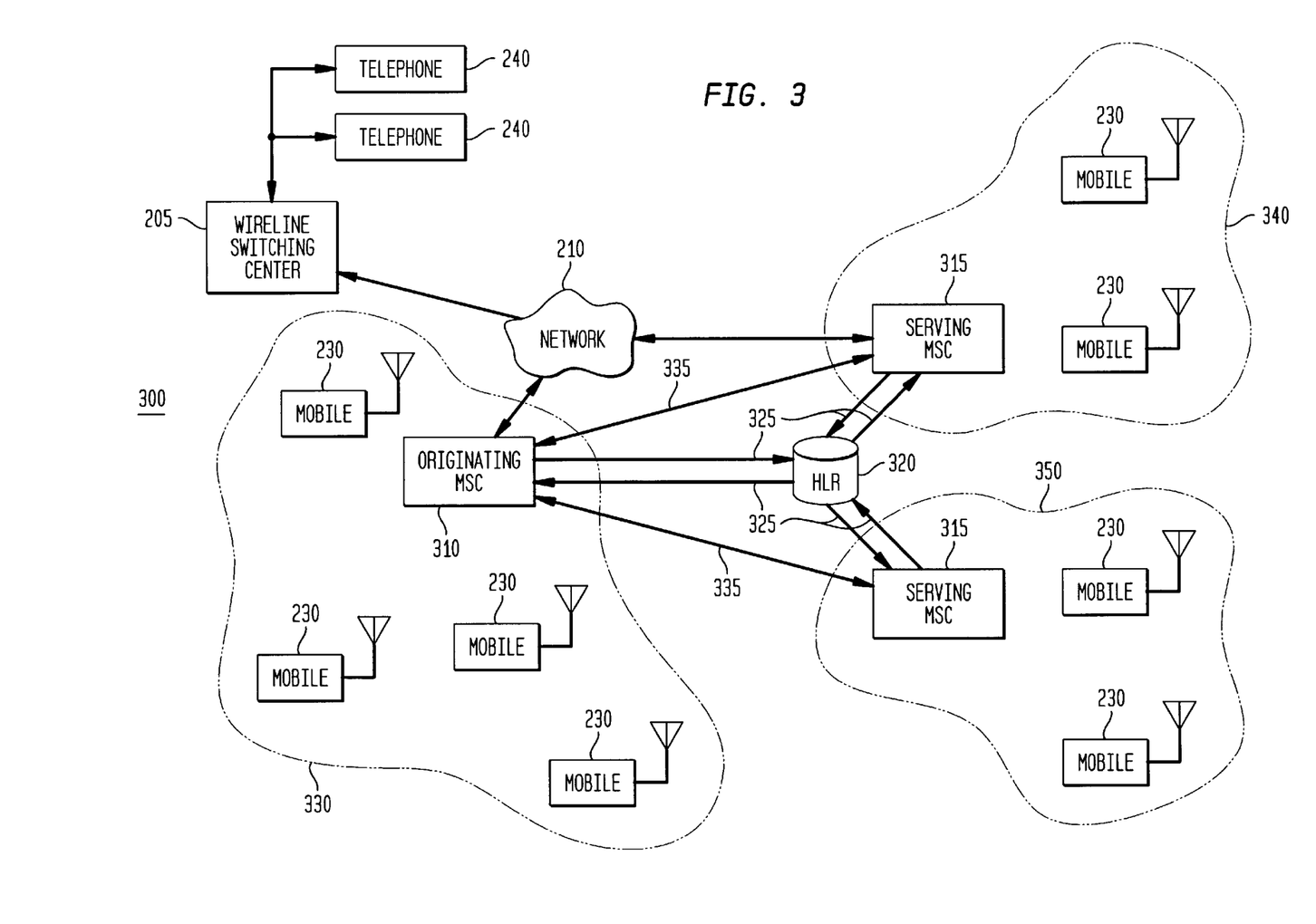
FIG. 3 is a block diagram illustrating a second system embodiment for wireless communication in accordance with the present invention.

FIG. 3 is a block diagram illustrating a second, preferred system embodiment 300 for wireless communication in accordance with the present invention, such as for ANSI-41 flexible alerting. In this system 300, the mobile switching centers 215 are represented by two types of MSCs. The first type of MSC, referred to as an incoming call MSC 310 or as an originating MSC 310, directly provides service to the mobile units 230 within its designated or predetermined geographic region 330. The second type of MSC, referred to as a serving MSCs 315, provides service to mobile units 230 which have traveled or roamed into their designated or predetermined geographic regions 340 and 350. A standalone home location register ("HLR") 320 is utilized in this preferred embodiment, among other things, to implement the database 220 and other ANSI-41 signaling functionality. The various MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections.

As indicated above, a user or subscriber typically defines their alerting group of secondary telephone numbers (or other directory numbers). These secondary DNs are those numbers that the subscriber would like alerted when their pilot or other primary DN is called. Continuing to refer to FIG. 3, when an originating MSC 310 receives an incoming call to or otherwise designating a pilot DN or other primary directory number, the originating MSC 310 transmits a query or other message to an HLR 320. Such a query is typically in the form of a data packet, and includes a reference to the pilot DN or other primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the pilot or primary DN is for a flexible alerting group or other multi-leg communications group, and if so, prepares a response or other message containing the secondary DNs (of the user's or subscriber's defined alerting group), and further containing their corresponding timing delay parameters, such as RSAT values, in accordance with the invention disclosed in the first related application. The HLR 320 then transmits, back to the originating MSC 310, a response data packet having a listing of secondary DNs with each of their corresponding timing delay parameters (RSAT values).

The originating MSC 310, utilizing the information contained in the response data packet (the listing of secondary DNs and each of their corresponding timing delay parameters), begins the processing and routing of each outgoing call leg to each secondary DN, with such processing and routing delayed according to each secondary DN's respective timing delay parameter, to provide concurrent alerting (approximately) for all of these secondary DNs in accordance with the invention disclosed in the first related application. As these outgoing calls are routed, in accordance with the present invention, a waiting signal or other distinguishing signal is added to each outgoing call leg. Other information useful to a called party prior to answering, as discussed above, may also be added to each call leg as it is being processed and routed.

If and when one of these outgoing call legs is answered, the originating MSC 310 connects the calling party (incoming leg) to that answered outgoing leg, followed by releasing the remaining outgoing legs and ceasing their alerting. At this time, other post-answering information, as discussed above, may be added to these outgoing call legs.

Figure 4:
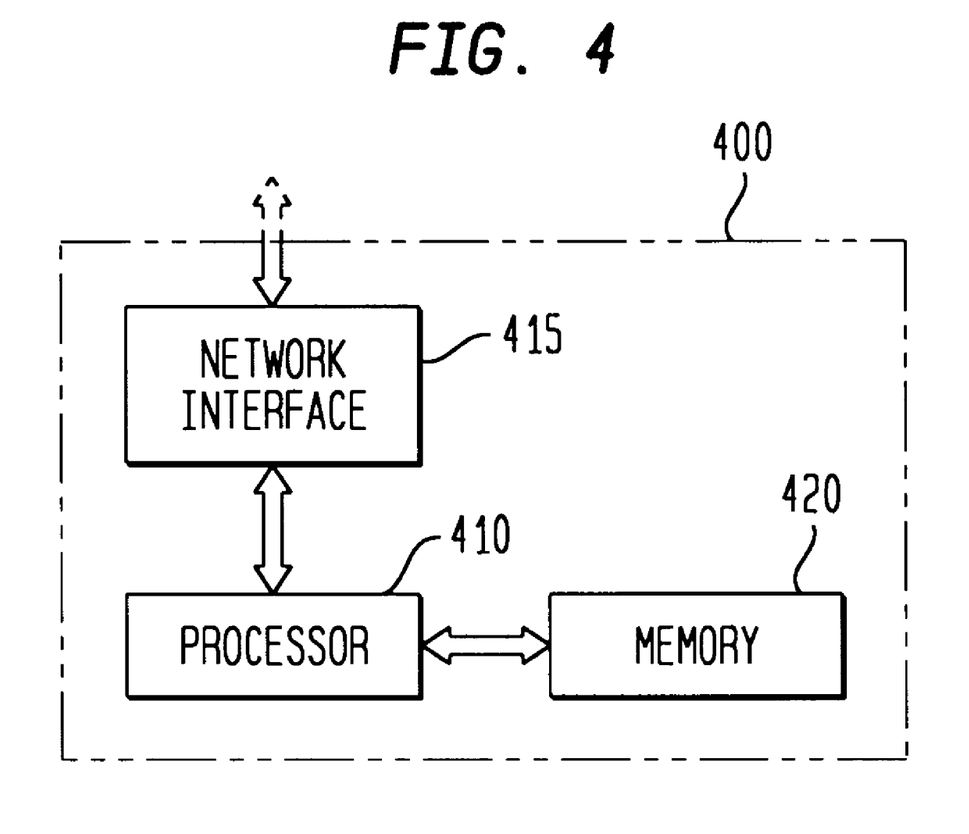
FIG. 4 is a block diagram illustrating an apparatus embodiment in accordance with the present invention.

FIG. 4 is a block diagram illustrating an apparatus embodiment 400 in accordance with the present invention. As discussed in greater detail below, such an apparatus 400 may be included within, or distributed among, an MSC (310 or 315) or HLR 320 of a system 300, or may be included within, or distributed among, a switching center 205 or 215 and database 220 of system 200. The apparatus 400 includes a processor 410, a network interface 415, and a memory 420. The network interface 415 is utilized to receive an incoming call leg to a pilot DN or primary DN, and to transmit the plurality of outgoing call legs to the secondary DNs associated with a primary DN. For example, in system 300, the network interface 415 may be couplable to the network 210 (via a trunk and signaling line) for transmission and reception of PSTN calls, and couplable to an antenna for transmission and reception of wireless calls. The memory 420 may be a magnetic hard drive, an optical storage device, or any other type of data storage apparatus. The memory 420 is used to store information pertaining to primary DNs, such as all associated secondary DNs and their timing delay parameters, and other call placement and routing information. The memory 420 performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or E²PROM. The methodology of the invention, as discussed above with reference to FIGS. 1, 2 and 3 and as discussed below with reference to FIG. 5, may be programmed and stored, in the processor 410, with its associated memory and other equivalent components, as a set of program instructions for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

In summary, the apparatus 400 for concurrent alerting of multiple leg telecommunication sessions, includes, first a network interface 415 for reception of an incoming call leg designating a primary directory number and for transmission of an outgoing call leg; second, a memory 420 having a plurality of secondary directory numbers associated with the primary directory number, and for each secondary directory number of the plurality of secondary directory numbers, further having a corresponding timing delay parameter; and third, a processor 410 coupled to the memory and the network interface. The processor, when operative, includes program instructions to differentially process and route each outgoing call leg associated with each secondary directory number, of the plurality of secondary directory numbers, according to its corresponding timing delay parameter. In addition, the processor is also operative to add a waiting signal or other distinguishing signal to each outgoing call leg, prior to answering, and to add any other selected information after a call leg has been answered.

Figure 5:
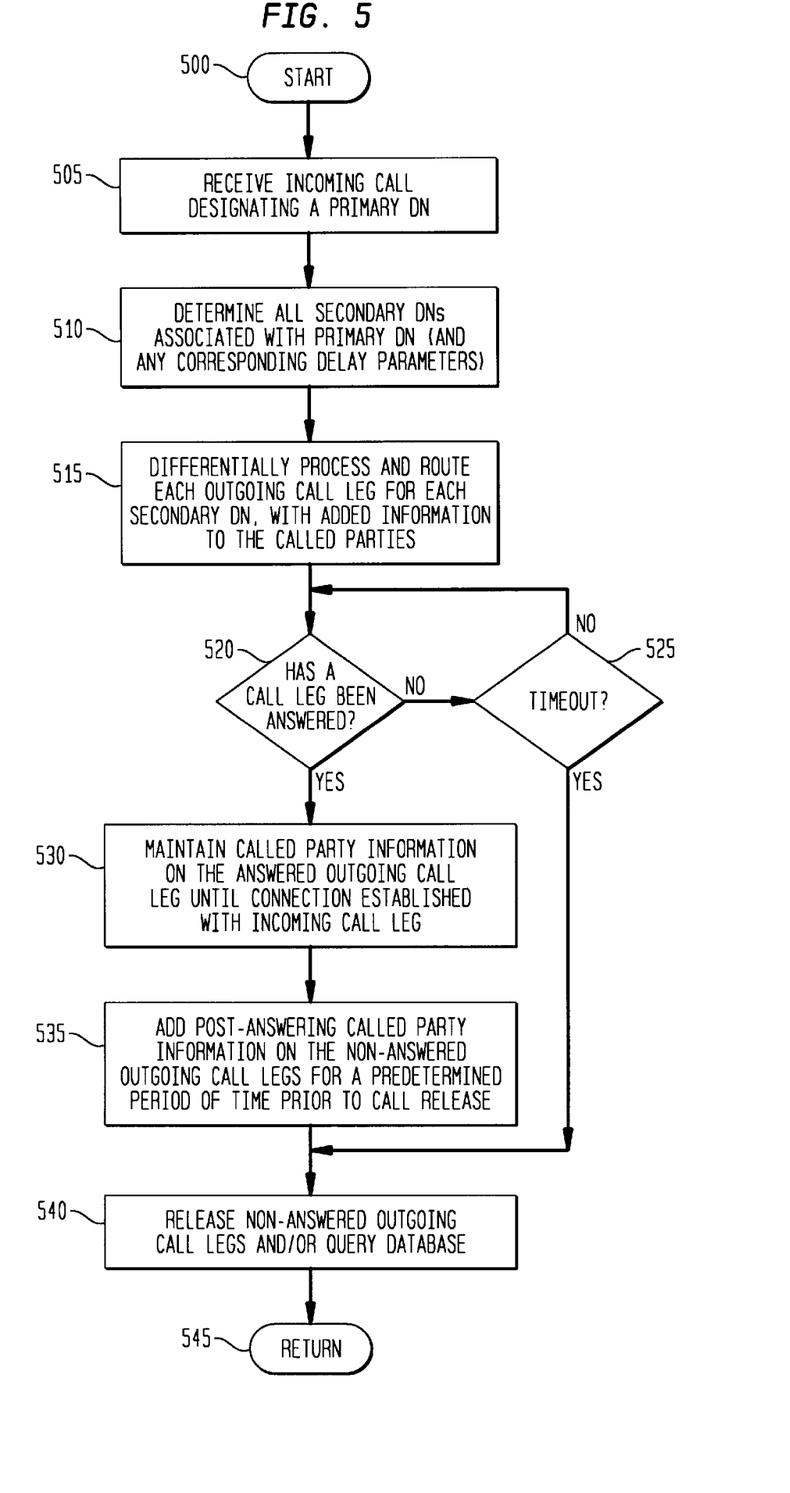
FIG. 5 is a flow diagram illustrating a method embodiment in accordance with the present invention.

FIG. 5 is a flow diagram illustrating a method embodiment in accordance with the present invention. Beginning with start step 500, the method begins with the reception of an incoming call leg designating a primary DN, step 505, such as a pilot DN of the ANSI-41 specification. Next, in step 510, the method determines all secondary DNs associated with the primary DN (and any corresponding timing delay parameters). As indicated above, this is usually performed in the preferred embodiment through a query to the HLR 320, such as an ANSI-41 LocationRequest. Following step 510, the method proceeds to differentially process and route each outgoing call leg to each secondary DN, adding pre-answering called party information to all outgoing call legs, and also preferably utilizing the corresponding timing delay parameter, step 515. More specifically, for each individual secondary DN, the method adds called party information, such as a waiting signal, called party identification (primary DN or secondary DN), or distinguishing calling party information (such as *, # or 99).

Following such differential processing and routing in step 515, the method determines whether an outgoing call leg has been answered, step 520, and if not, the method waits for a call leg to be answered or times out, step 525. If in step 525 no call leg has been answered prior to timing out, the method proceeds to step 540, discussed below. When in step 525 no time out has occurred, the method continues to determine whether an outgoing call leg has been answered, in step 520. When a call leg has been answered in step 520, the method maintains called party information on the answered outgoing call leg for a (first) period of time, step 530. For example, a waiting signal may be maintained on the answered call leg for a short time, such as less than one-half of a second, until the voice path with the incoming call leg has been connected. Preferably concurrently with step 530, in step 535, post-answering called party information is added to the non-answering outgoing call legs, for a second period of time, prior to the release of the non-answering call legs. For example, a distinctive alert indicating that another outgoing call leg has answered the incoming call may be provided, such as a distinctive ring for several seconds. Following step 535, all non-answered outgoing call legs are released, and/or the database (HLR 320) is queried for further instructions, step 540. Following step 540, the method may end, return step 545.

As may be apparent from the above discussion, the system, apparatus and method of the present invention provide significant advantages. First, in accordance with the present invention, the outgoing call legs of a flexible alerting group are concurrently alerted and provided with information distinguishing a flexible alerting call from a direct call. As a consequence, use of the present invention avoids the problems which may arise in flexible alerting groups, in which a called party would otherwise not recognize the occurrence of a connection lag time, and corresponding loss of information attempted to be communicated. The use of the present invention results in a more efficient allocation of resources, both of the consumer and of the service provider, and greater consumer satisfaction, avoids potential consumer irritation and dissatisfaction which may arise when the various members of a flexible alerting group continue to try to answer outgoing call legs which have been answered by other members. In addition, the apparatus, method and system of the present invention also are user friendly, with the provision of information to a called party occurring transparently to a user and within a system embodiment.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method of providing information to a called party in multiple leg telecommunication sessions, the method comprising:
   (a) receiving an incoming call leg designating a primary directory number;
   (b) determining a plurality of secondary directory numbers associated with the primary directory number;
   (c) differentially processing and routing each outgoing call leg associated with each secondary directory number, of the plurality of secondary directory numbers, and providing in each outgoing call leg, of a plurality of outgoing call legs, first called party information distinguishing each outgoing call leg as a multiple leg telecommunication session; and
   (d) maintaining the first called party information, on an answered outgoing call leg, for a period of time at least as long as a connection time lag period.

2. The method of claim 1 wherein the first called party information is a waiting signal.

3. The method of claim 2 wherein the waiting signal is a steady, audible tone.

4. The method of claim 1 wherein the first called party information is a primary directory number.

5. The method of claim 1 wherein the first called party information is a calling party identification having a distinctive identifier.

6. The method of claim 1 wherein the first called party information is a language request.

7. The method of claim 1 wherein the first called party information is an indicator of an amount of outgoing call legs in the plurality of outgoing calls.

8. The method of claim 1, further comprising:
   (e) subsequent to an answering of an outgoing call leg, providing a second called party information to all non-answering outgoing call legs of the plurality of outgoing call legs.

9. The method of claim 8 wherein the second called party information is an indication of the answering of the outgoing call leg.

10. A system for providing information to a called party in multiple leg telecommunication sessions, the system comprising:
    a database, the database having stored in a memory a plurality of secondary directory numbers associated with a primary directory number; and
    a switching center coupled to the database, the switching center further having an interface for receiving an incoming call leg designating the primary directory number and for differentially processing and routing each outgoing call leg associated with each secondary directory number, of the plurality of secondary directory numbers, the switching center further providing in each outgoing call leg, of a plurality of outgoing call legs, first called party information distinguishing each outgoing call leg as a multiple leg telecommunication session, the switching center further maintaining the first called party information, on an answered outgoing call leg, for a period of time at least as long as a connection time lag period.

11. The system of claim 10 wherein the first called party information is a waiting signal.

12. The system of claim 11 wherein the waiting signal is a steady, audible tone.

13. The system of claim 10 wherein the first called party information is a primary directory number.

14. The system of claim 10 wherein the first called party information is a calling party identification having a distinctive identifier.

15. The system of claim 10 wherein the first called party information is a language request.

16. The system of claim 10 wherein the first called party information is an indicator of an amount of outgoing call legs in the plurality of outgoing calls.

17. The system of claim 10, wherein the switching center, subsequent to an answering of an outgoing call leg, further provides a second called party information to all non-answering outgoing call legs of the plurality of outgoing call legs.

18. The system of claim 17, wherein the second called party information is an indication of the answering of the outgoing call leg.

19. The system of claim 10, wherein the database is a home location register.

20. The system of claim 10 wherein the switching center is a mobile switching center.

21. An apparatus for providing information to a called party in multiple leg telecommunication sessions, the apparatus comprising:
   a network interface for reception of an incoming call leg designating a primary directory number and for transmission of an outgoing call leg;
   a memory having a plurality of secondary directory numbers associated with the primary directory number; and
   a processor coupled to the memory and the network interface, wherein the processor, when operative, includes program instructions to differentially process and route each outgoing call leg associated with each secondary directory number, of the plurality of secondary directory numbers, and to provide in each outgoing call leg, of a plurality of outgoing call legs, first called party information distinguishing each outgoing call leg as a multiple leg telecommunication session, the processor including further program instructions to maintain the first called party information, on an answered outgoing call leg, for a period of time at least as long as a connection time lag period.

22. The apparatus of claim 21 wherein the first called party information is a waiting signal.

23. The apparatus of claim 22 wherein the waiting signal is a steady, audible tone.

24. The apparatus of claim 21 wherein the first called party information is a primary directory number.

25. The apparatus of claim 21 wherein the first called party information is a calling party identification having a distinctive identifier.

26. The apparatus of claim 21 wherein the first called party information is a language request.

27. The apparatus of claim 21 wherein the first called party information is an indicator of an amount of outgoing call legs in the plurality of outgoing calls.

28. The apparatus of claim 21, wherein the processor has further instructions to, subsequent to an answering of an outgoing call leg, provide a second called party information to all non-answering outgoing call legs of the plurality of outgoing call legs.

29. The apparatus of claim 28, wherein the second called party information is an indication of the answering of the outgoing call leg.

30. A system for providing information to a called party in outgoing call legs of a flexible alerting service, the system comprising:
   a home location register, the home location register having stored in a memory a plurality of secondary directory numbers associated with a pilot directory number; and
   a mobile switching center coupled to the home location register, the mobile switching center further having an interface for receiving an incoming call leg designating the pilot directory number and for differentially processing and routing each outgoing call leg associated with each secondary directory number, of the plurality of secondary directory numbers, the mobile switching center further providing in each outgoing call leg, of a plurality of outgoing call legs, first called party information distinguishing each outgoing call leg as a multiple leg telecommunication session, the mobile switching center further maintaining the first called party information, on an answered outgoing call leg, for a period of time at least as long as a connection time lag period.

31. The system of claim 30 wherein the first called party information is a waiting signal.

32. The system of claim 31 wherein the waiting signal is a steady, audible tone.

33. The system of claim 30 wherein the first called party information is a primary directory number.

34. The system of claim 30 wherein the first called party information is a calling party identification having a distinctive identifier.

35. The system of claim 30 wherein the first called party information is a language request.

36. The system of claim 30 wherein the first called party information is an indicator of an amount of outgoing call legs in the plurality of outgoing calls.

37. The system of claim 30, wherein the switching center, subsequent to an answering of an outgoing call leg, further provides a second called party information to all non-answering outgoing call legs of the plurality of outgoing call legs.

38. The system of claim 37, wherein the second called party information is an indication of the answering of the outgoing call leg.

* * * * *